(12) United States Patent
Onishi et al.

(10) Patent No.: US 7,877,728 B2
(45) Date of Patent: Jan. 25, 2011

(54) SEQUENCE PROGRAM EDITING APPARATUS

(75) Inventors: Yasushi Onishi, Fujiyoshida (JP); Toshiyuki Matsuo, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 1302 days.

(21) Appl. No.: 11/416,138

(22) Filed: May 3, 2006

(65) Prior Publication Data
US 2006/0287736 A1    Dec. 21, 2006

(30) Foreign Application Priority Data
May 10, 2005    (JP) ............................. 2005-137614

(51) Int. Cl.
*G06F 9/44* (2006.01)
(52) U.S. Cl. ...................... 717/110; 711/133; 711/159; 711/E12.069; 700/23; 700/24
(58) Field of Classification Search .................. 717/110; 711/133, 159, 221, E12.069, E12.07, E12.086, 711/E12.087; 710/8; 700/23
See application file for complete search history.

(56) References Cited

U.S. PATENT DOCUMENTS

| | | | | |
|---|---|---|---|---|
| 4,047,244 A | * | 9/1977 | Finkemeyer et al. ........... 710/56 |
| 4,188,670 A | * | 2/1980 | Hsia ......................... 365/49.17 |
| 4,434,487 A | * | 2/1984 | Rubinson et al. ............. 714/710 |
| 4,635,189 A | | 1/1987 | Kendall |
| 4,667,294 A | * | 5/1987 | Shima et al. ................. 700/179 |
| 4,907,192 A | * | 3/1990 | Kaneko ....................... 712/236 |
| 5,177,420 A | * | 1/1993 | Wada et al. ............. 318/568.11 |
| 5,210,833 A | * | 5/1993 | Kaneko ....................... 712/236 |
| 5,225,975 A | | 7/1993 | Gates et al. |
| 5,243,511 A | | 9/1993 | Zifferer et al. |
| 5,408,672 A | * | 4/1995 | Miyazawa et al. ............ 712/37 |
| 5,623,666 A | * | 4/1997 | Pike et al. ........................... 1/1 |
| 5,678,013 A | * | 10/1997 | Smith et al. .................. 715/866 |
| 5,710,894 A | * | 1/1998 | Maulsby et al. ............. 715/763 |
| 5,825,783 A | * | 10/1998 | Momohara ................... 714/718 |
| 5,845,149 A | | 12/1998 | Husted et al. |
| 5,887,061 A | * | 3/1999 | Sato ........................... 380/217 |
| 5,901,105 A | * | 5/1999 | Ong et al. .............. 365/230.06 |

(Continued)

FOREIGN PATENT DOCUMENTS

EP    1 237 308    9/2002

(Continued)

OTHER PUBLICATIONS

English Machine Translation of Japanese Patent 04-039763, published on Feb. 10, 1992.*

(Continued)

*Primary Examiner*—Chameli C Das
(74) *Attorney, Agent, or Firm*—Staas & Halsey LLP (57) ABSTRACT

Replacement of a signal address referred to in a sequence program is carried out by storing in advance, before-after replacement information which specifies the relationship between signal addresses before replacement and signal addresses after replacement in a format with a specifying of range. Based on the stored before-after replacement information, all the signal addresses to be replaced are searched for in the editing target sequence program or replacement target symbol information. Replacement of a searched signal address with a corresponding after-replacement signal address is executed in accordance with the before-after replacement information.

3 Claims, 5 Drawing Sheets

U.S. PATENT DOCUMENTS

| | | | |
|---|---|---|---|
| 6,189,145 B1 * | 2/2001 | Bellin et al. | 717/170 |
| 6,257,774 B1 * | 7/2001 | Stack | 717/110 |
| 6,341,109 B1 * | 1/2002 | Kayanuma | 369/47.14 |
| 6,343,866 B1 | 2/2002 | Cao et al. | |
| 6,356,552 B1 * | 3/2002 | Foglar | 370/395.1 |
| 6,536,034 B1 * | 3/2003 | Nassor | 717/110 |
| 6,711,563 B1 * | 3/2004 | Koskas | 707/769 |
| 6,952,811 B1 * | 10/2005 | Iwata et al. | 716/4 |
| 7,328,426 B2 * | 2/2008 | Cosimo et al. | 717/113 |
| 7,386,834 B2 * | 6/2008 | Van De Vanter et al. | 717/110 |
| 7,823,144 B2 * | 10/2010 | Pazel et al. | 717/168 |
| 2002/0059012 A1 * | 5/2002 | Ogawa et al. | 700/121 |
| 2003/0037114 A1 * | 2/2003 | Nishio et al. | 709/206 |
| 2003/0072190 A1 * | 4/2003 | Miki et al. | 365/200 |
| 2004/0003373 A1 * | 1/2004 | Van De Vanter et al. | 717/112 |
| 2004/0167658 A1 * | 8/2004 | Nagashima et al. | 700/159 |
| 2004/0210867 A1 * | 10/2004 | Inoue et al. | 717/110 |
| 2005/0213215 A1 | 9/2005 | Mitamura et al. | |
| 2005/0228953 A1 * | 10/2005 | Rowlands | 711/133 |
| 2005/0231765 A1 * | 10/2005 | So et al. | 358/1.16 |
| 2006/0155889 A1 * | 7/2006 | Furushima et al. | 710/8 |

FOREIGN PATENT DOCUMENTS

| | | |
|---|---|---|
| JP | 04-039763 | 2/1992 |
| JP | 4-195582 | 7/1992 |
| JP | 4-335402 | 11/1992 |
| JP | 4-367029 | 12/1992 |
| JP | 10-124119 | 5/1998 |
| JP | 3033133 | 4/2000 |
| JP | 2002-182712 | 6/2002 |
| JP | 2005-92808 | 4/2005 |

OTHER PUBLICATIONS

English Machine Translation of Japanese Patent 2005-038251, published on 2005.*

English Machine Translation of Japanese Patent JP10-124119, A, (1998) published on 1998.*

Title: Automatic regeneration of sequence programs for operating plants, source: IEEE, author: Ikkai, Y. et al, dated: Aug. 6, 2002.*

Title: Automatic regeneration system for sequential control programs, source: IEEE, authorI kkai, Y. et al, dated: Aug. 5, 1996.*

European Search Report in corresponding Application No. 050286350-2216 dated Jul. 14, 2006.

Japanese Patent Office Notice of Reasons for Rejection, mailed Mar. 6, 2007, and issued in corresponding Japanese Patent Application No. 2005-137614.

European Search Report in corresponding Application No. 06251997.0-2206 dated Aug. 29, 2006.

* cited by examiner

| ADDRESS BATCH REPLACEMENT | | | | ☒ |
|---|---|---|---|---|
| REPLACEMENT TARGET | ALL PROGRAMS | SELECT(T) | | |
| ADDRESS SETTING | NEWLY ADD(N) | | | EXECUTE |
| No | BEFORE REPLACEMENT | | AFTER REPLACEMENT | |
| 1 | R0.0 | | R1.0 | CLOSE |
| 2 | R1.0 | | Y4.2 | |
| 3 | R2.0 | | R0.0 | |
| 4 | R3 | R5 | R5   R7 | |
| | | | | VIEW LOG |

```
## SEQUENCE    ########
         PROGRAM
   PROGRAM(5)
       Net03    R0.0   =>   R1.0
       Net03    R2.0   =>   R0.0
       Net03    R4.7   =>   R6.7
       Net03    R1.0   =>   Y4.2

NUMBER OF
   ADDRESSES REPLACED   = 4
   NUMBER OF ERRORS     = 0

## SYMBOL      ########
         TABLE
   SYMBOL(5)
       R0.0   =>   R1.0   abc1
       R1.0   =>   Y4.2   def2
       R2.0   =>   R0.0   ghi3
       R4.7   =>   R6.7   hij4
       R5     =>   R7     klm5

NUMBER OF
   ADDRESSES REPLACED   = 5
   NUMBER OF ERRORS     = 0

*** ADDRESS BATCH ***
       REPLACEMENT COMPLETED
```

SEQUENCE PROGRAM EDITING APPARATUS

BACKGROUND OF THE INVENTION

1. Field of the Invention

The present invention relates to an editing apparatus for editing a sequence program used to control an automatic machine such as a machine tool or robot and, more particularly, to a sequence program editing apparatus with improved operability in replacement of a plurality of signal addresses referred to in a sequence program.

2. Description of the Related Art

As is well known, signal addresses are generally referred to in a sequence program used to control an automatic machine such as a machine tool or robot. Events such as a change in a part of a system including an automatic machine and the addition of a part to the system may necessitate changing all or some of the signal addresses. In such a case, replacement of the signal addresses is conventionally performed by editing work including a repetition of the following procedure using an editing program:

(1) Specify one of a plurality of signal addresses desired to be replaced (signal addresses to be replaced) and specify one after-replacement signal address for the specified signal address (the first specification).

(2) Search the sequence program for all the specified replacement target signal address (the first search).

(3) Replace the searched signal address with the after-replacement signal address specified in association with the searched address (the first replacement).

(4) Specify another one of the plurality of signal addresses to be replaced and specify one after-replacement signal address for the specified signal address (the second specification).

(5) Search the sequence program for all the specified replacement target signal address (the second search).

(6) Replace the searched signal address with the after-replacement signal address specified in association with the searched address (the second replacement).

(7) Repeat specification, search, and replacement steps (the third specification, search, and replacement steps, the fourth specification, search, and replacement steps, . . . ) until there is no more replacement target signal address.

As for search and replacement steps of the procedure, an operator only needs to enter an instruction by means of an operation key or the like. The steps are automatically performed by the function of the editing program. However, the operation involves several iterations of address specification and several iterations of entry of an instruction to execute search and replacement and takes time. In a replacement step as described above, if a set of signal addresses to be replaced and a set of after-replacement signal addresses have a common element (the same signal address), unintentional replacement may occur.

A simple example of such a case is replacement in which two signal addresses are interchanged. For example, assume that to replace signal addresses of A1 and A2 with the signal addresses of A2 and A1, respectively, replacement "A1→A2" is first executed, and then, replacement "A2→A1" is executed. In this case, the final version of the sequence program does not contain the address of A2 (which has once appeared but then disappeared) but contains only the address of A1. To prevent such a situation, one of the signal addresses needs to be replaced with an unused signal address, which complicates the operation. If three or more signal addresses need to be interchanged, the operation becomes more complicated, and an operation mistake becomes more likely to occur.

An editing apparatus which stores a plurality of character strings to be replaced and replaces them with other ones is made known by Japanese Patent Application Laid-Open No. 4-39763. However, the text editing apparatus described in the above patent document is not intended to be applied to replacement of signal addresses in a sequence program used to control an automatic machine. Also, target character strings before replacement and those after replacement are registered for each character string, and it is impossible to register before-replacement signal addresses and after-replacement signal addresses by specifying the range of signal addresses. More specifically, the above patent document does not explain, e.g., a function of registering replacement of A1 with B11, replacement of A2 with B12, replacement of A3 with B13, . . . , replacement of A10 with B20 by specifying the range of signal addresses, such as inputting "A1→A10→B11-B20" and executing replacement in the lump.

SUMMARY OF THE INVENTION

Under the circumstances, the present invention has as its basic object to provide a sequence program editing apparatus improved to save troublesome operation and prevent execution of unintentional replacement at the time of replacement of a plurality of signal addresses referred to in a sequence program used to control an automatic machine such as a machine tool or robot.

The present invention also aims at, if symbol information is assigned to a signal address, allowing execution of replacement of a plurality of signal addresses in symbol information as well in the same manner.

The present invention is further intended to allow registration of signal addresses before and after replacements by specifying the range of signal addresses in this signal address replacement. Note that in the following explanation, 'specifying of range' means specifying all the constituents of a group of before-replacement signal addresses or after-replacement signal addresses, by just specifying the character strings at the both ends of a permutation, in case where the permutation is formed with a plurality of character strings each representing an signal address and a part of, or whole of, those character strings are arranged in an appropriate order such that they changes successively to form such a permutation.

For example, assume a case of replacing four signal addresses, R1.0, R1.1, R1.2, and R1.3 (the digits in the first decimal place sequentially change in the order of 0, 1, 2, and 3) with R1.4, R1.5, R1.6, and R1.7, respectively. To register these signal addresses by specifying of range, registration of "R1.0-R3.0" as a signal address before replacement and registration of "R1.4-R1.7" as a corresponding signal address after replacement will suffice.

To perform registration of the same details not by specifying of range but by conventional individual specification, the after-replacement signal address of R1.4 is so registered as to correspond to the signal address of R1.0; the after-replacement signal address of R1.5, the signal address of R1.1; the after-replacement signal address of R1.6, the signal address of R1.2; and the after-replacement signal address of R1.7, the signal address of R1.3.

In the present invention, when replacement of a signal address referred to in a sequence program is to be performed, before-after replacement information which specify the relationship between signal addresses before replacement and signal addresses after replacement in a format with a specifying of range are registered and stored in advance. On the basis of the before-after replacement information, all the replacement target signal address are searched for in the editing target sequence program or replacement target symbol information, and replacement of the searched signal address with a corresponding after-replacement signal addresses is executed in accordance with the before-after replacement information.

A first aspect of a sequence program editing apparatus for editing a sequence program used to control an automatic machine according to the present invention comprises: program storage means for storing a editing target sequence program; registration and storage means for registering and storing before-after replacement information which specify a plurality of signal addresses to be replaced and after-replacement signal addresses corresponding to the plurality of specified signal addresses; first search means for searching for the signal addresses to be replaced in the editing target sequence program on the basis of the before-after replacement information registered and stored in said registration and storage means; and first signal address replacement means for executing replacement of the signal address to be replaced which was searched by the first search means with a corresponding after-replacement signal address in accordance with the before-after replacement information.

A second aspect of a sequence program editing apparatus for editing a sequence program used to control an automatic machine according to the present invention comprises: replacement target symbol storage means for storing symbol information assigned to a signal address used in a editing target sequence program; registration and storage means for registering and storing before-after replacement information which specify a plurality of signal addresses to be replaced and after-replacement signal addresses corresponding to the plurality of specified signal addresses; second search means for searching for the signal address to be replaced in symbol information stored in said replacement target symbol storage means on the basis of the before-after replacement information registered and stored in said registration and storage means; and second signal address replacement means for executing replacement of the signal address searched by said second search means with a corresponding after-replacement signal address in accordance with the before-after replacement information.

A third aspect of a sequence program editing apparatus for editing a sequence program used to control an automatic machine according to the present invention comprises: program storage means for storing a editing target sequence program; registration and storage means for registering and storing before-after replacement information which specify a plurality of signal addresses to be replaced and after-replacement signal addresses corresponding to the plurality of specified signal addresses; first search means for searching for the signal addresses to be replaced in the editing target sequence program on the basis of the before-after replacement information registered and stored in said registration and storage means; first signal address replacement means for executing replacement of the signal address to be replaced which was searched by the first search means with a corresponding after-replacement signal address in accordance with the before-after replacement information; replacement target symbol storage means for storing symbol information assigned to a signal address used in the editing target sequence program; second search means for searching for the signal address to be replaced in symbol information stored in said replacement target symbol storage means on the basis of the before-after replacement information registered and stored in said registration and storage means; and second signal address replacement means for executing replacement of the signal address searched by said second search means with a corresponding after-replacement signal address in accordance with the before-after replacement information.

The sequence program editing apparatus of the first to third aspects can have the following features.

As for registration of a plurality of signal addresses to be replaced and a plurality of after-replacement signal addresses corresponding to the signal addresses to be replaced, said registration and storage means may allow registration of the plurality of signal addresses to be replaced and the plurality of after-replacement signal addresses by specifying of range.

The sequence program editing apparatus may further comprise replacement position information storage means for storing information indicating a position of the editing target sequence program where signal address replacement is executed; and display means for, after replacement, displaying replacement position information of the editing target sequence program on the basis of the information stored in said replacement position information storage means.

The sequence program editing apparatus may further comprise means for, if a cancel instruction is internally issued after one of said first signal address replacement means and said second signal address replacement means starts execution of replacement, canceling the replacement which has been executed by the one of said first signal address replacement means and said second signal address replacement means.

The sequence program editing apparatus of the first or third aspects can have the following features.

The registration and storage means may comprise means for specifying a subprogram included in the editing target sequence program and means for replacing signal addresses in the subprogram specified by the specifying means in accordance with the before-after replacement information.

The sequence program editing apparatus of the second or third aspects can have the following features.

The registration and storage means may comprise means for specifying a subprogram included in the editing target sequence program as a replacement target, and means for replacing a signal address in the specified symbol information in accordance with the before-after replacement information.

According to the present invention, replacement of a plurality of signal addresses referred to in a sequence program requires no troublesome operation, which reduces the possibility of executing unintentional replacement. If symbol information is assigned to a signal address, signal address replacement can be executed in the same manner for the symbol information, thus improving the operability in these terms as well. Additionally, allowance of registration of signal addresses before and after replacements by specifying the range of signal addresses makes it possible to further simplify the operation.

BRIEF DESCRIPTION OF THE DRAWINGS

The above and other objects and features of the present invention will become apparent from the following description of an embodiment taken in conjunction with the accompanying drawings, in which.

DETAILED DESCRIPTION OF THE PREFERRED EMBODIMENTS

An embodiment of the present invention will be explained below with reference to the drawings. As described above, the present invention relates to a sequence program editing apparatus for editing a sequence program used to control an automatic machine. Generally, various pieces of information equipment with software handling ability (e.g., a personal computer) can each be set up as a sequence program editing apparatus according to the present invention if they are provided with software (including various associated data) required to perform processing (to be described later). As an example, a case will be explained here where a numerical controller (CNC) which controls a machine tool through a PMC (programmable machine controller) is used as a sequence program editing apparatus. Needless to say, the following explanation is essentially no different from that of a case where another piece of information equipment (e.g., a personal computer) is used instead.

Figure 1:
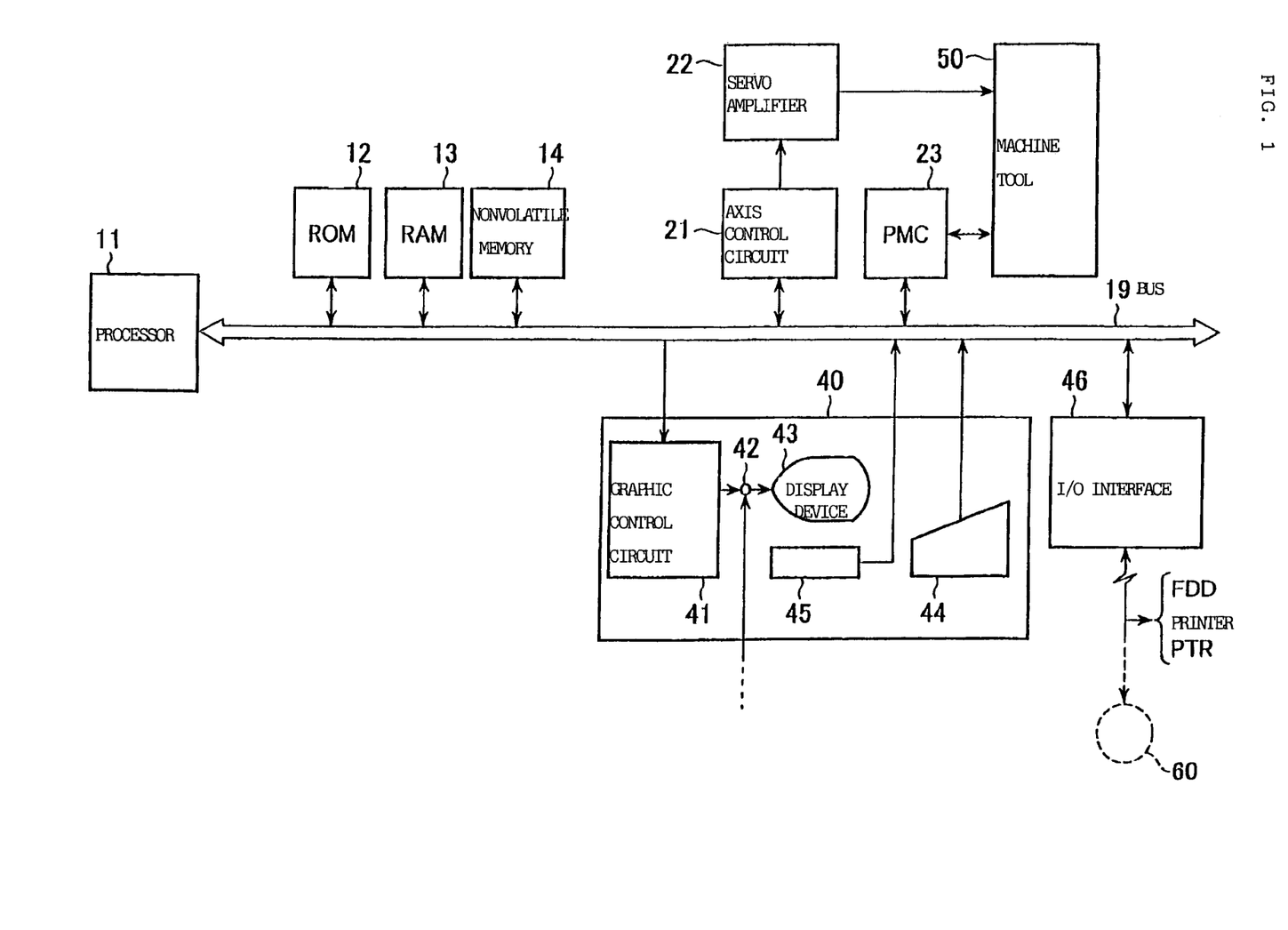
FIG. 1 is a diagram showing an embodiment of a sequence program editing apparatus according to the present invention.

FIG. 1 is a diagram showing the overall configuration of the embodiment including a sequence program editing apparatus according to the present invention. The system is composed of a CNC and a machine tool connected to the CNC through a PMC. Reference numeral 11 denotes a processor constituting a CPU which control parts. The processor 11 is connected, through a bus 19, to various devices, i.e., a ROM 12, a RAM 13, a nonvolatile memory 14, an axis control circuit 21, a PMC 23, a graphic control circuit 41, a display device (CRT) 43, a keyboard 44, software keys 45, and an I/O interface 46. Reference numeral 42 denotes a switcher. The display device (CRT) 43 can be switched to another graphic control circuit (not shown) through the switcher 42.

The processor 11 controls the whole of the CNC in accordance with a system program stored in the ROM 12. The RAM 13 is used to store various data and temporarily store data for processing performed by the processor 11.

A memory using a CMOS is employed as the nonvolatile memory 14. The nonvolatile memory 14 is battery-backed and stores parameters, a pitch error correction amount, a machine tool error correction amount, and the like to be held even after power-off. The nonvolatile memory 14 is also used to store a sequence program, symbol information, and the like in connection with signal address replacement (to be described later).

Upon receipt of an axis move instruction from the processor 11, the axis control circuit 21 outputs the axis move instruction to the servo amplifier 22. The servo amplifier 22 receives the move instruction and drives a servo motor of an automatic machine (in this example, a machine tool 50). The PMC 23 receives a T function signal (machine tool select instruction) and the like upon execution of an NC program.

The PMC 23 processes this signal with the sequence program and outputs it as an operation instruction, thereby controlling the machine tool 50. Upon receipt of a status signal from the machine tool 50, the PMC 23 performs sequence processing and transfers a necessary input signal to the processor 11. The I/O interface 46 connected to the bus 19 controls input and output of various data among pieces of external equipment such as an FDD (floppy disk drive), a printer, a PTR (paper tape reader), and the like. Note that a memory card reader (or HDD) 60 can be connected to the I/O interface 46, as indicated by a broken line.

A plurality of sequence programs for controlling the automatic machine (in this example, the machine tool 50) as described above are stored in advance in the nonvolatile memory 14. Generally, each sequence program is composed of a group of several subprograms. As described above, signal addresses are commonly referred to in each sequence program. This embodiment will explain the procedure for implementing desired replacement with regard to signal addresses and associated symbol information in a desired sequence program, using the system shown in FIG. 1.

Figure 2:
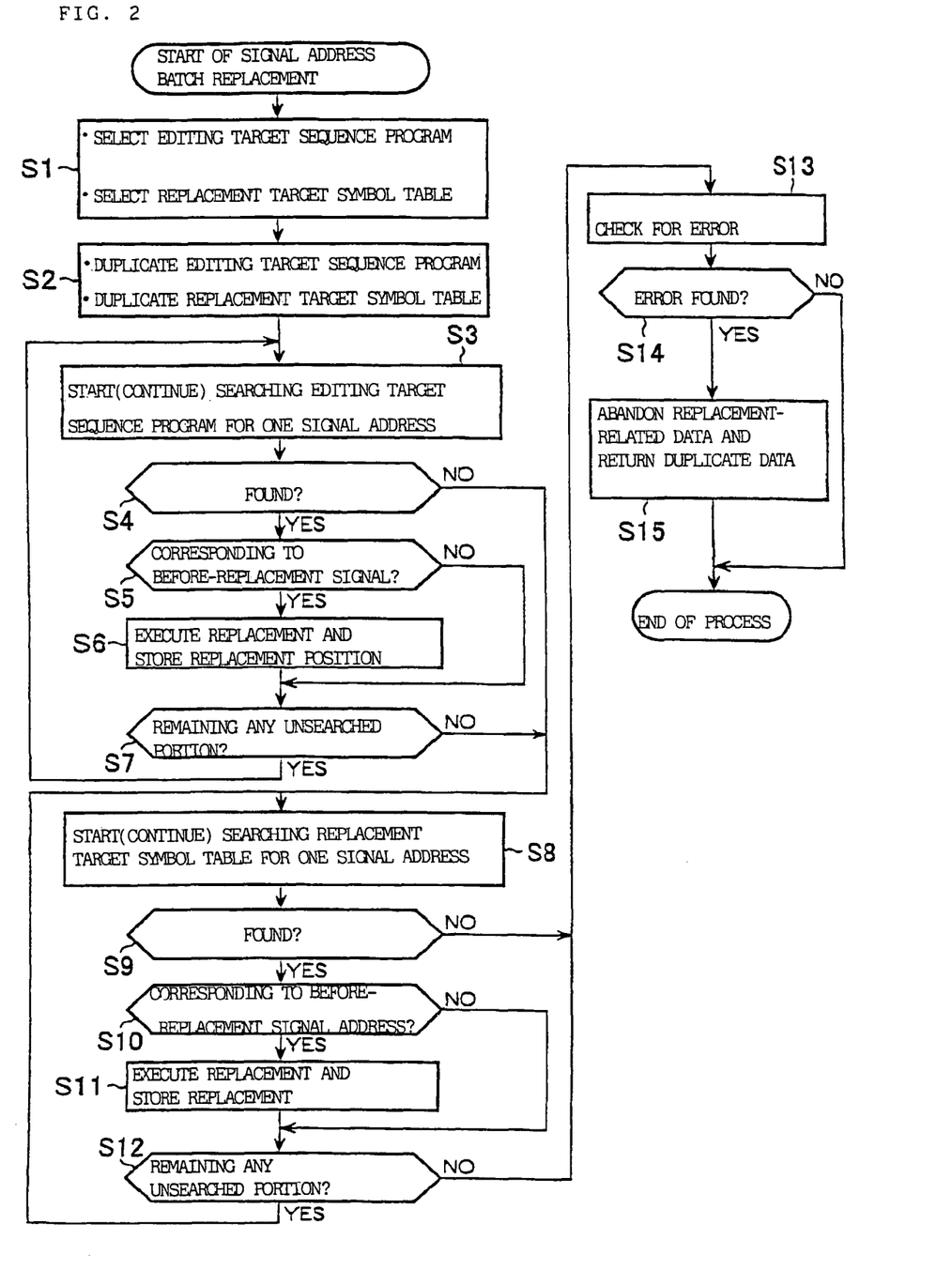
FIG. 2 is a flowchart describing the outline of batch replacement processing executed by the sequence program editing apparatus in FIG. 1.

FIG. 2 is a flowchart showing the outline of processing for the procedure. The main point of each step will be explained below with appropriate reference to FIG. 3 and subsequent drawings.

Figure 3:
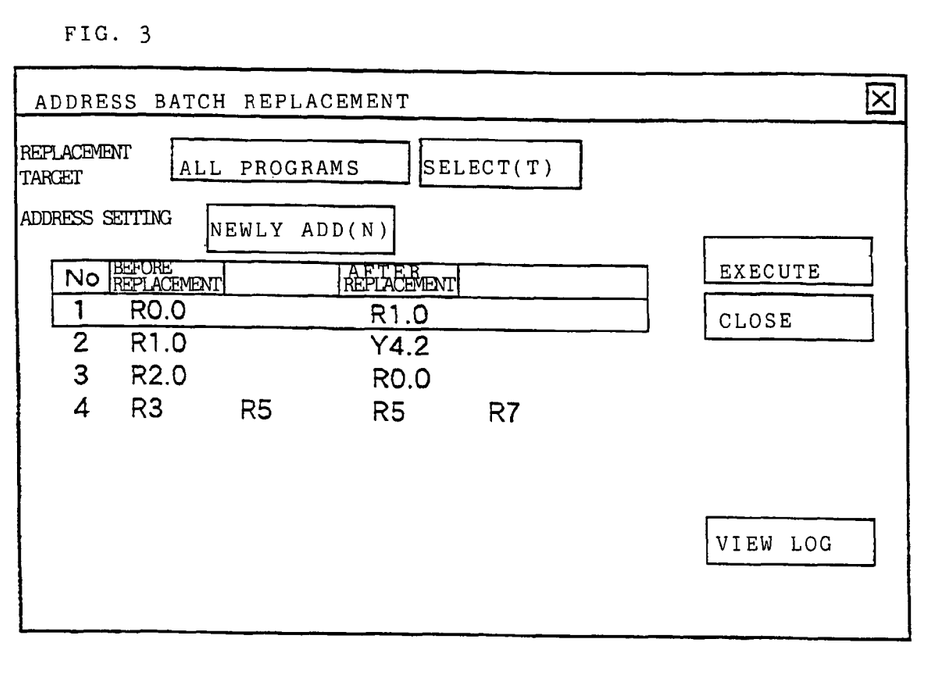
FIG. 3 is a view showing an example of a screen for registering before-after replacement information of signal address information and the like in the process in FIG. 2.

Step S1: A registration screen as shown in FIG. 3 is first called upon the display device43 with operation of the keyboard 44 or the like to register before-after replacement information of signal addresses (the correspondence signal addresses before replacement and signal addresses after replacement) Selection of a editing target sequence program and a symbol table to be replaced in which registered signal addresses are to be replaced is also performed on the screen. A symbol table here refers to storage means for storing, in tabular form, a signal address and symbol information assigned to the signal address in contrast with each other. A symbol table to be replaced is storage means (a table) in which signal addresses are prepared to be replaced with respect to the stored symbol information.

In the example of the registration screen in FIG. 3, a editing target sequence program (replaced) is set to "All Programs." That is, all sequence programs stored in the nonvolatile memory 14 are objects to be replaced. To select only some of the sequence programs, a sequence program list (not shown) needs to be called upon the screen. On the sequence program list, the names of subprograms belonging to the sequence programs are displayed together with the names of the sequence programs. A sequence program desired to be selected or a specific subprogram is specified on the screen.

Note that in this example, if a sequence program (or sequence programs) to be edited or a subprogram (or subprograms) thereof is selected, then a symbol table (or symbol tables) to be replaced belonging to the selected one (ones) is automatically selected. The registration screen in FIG. 3 does not include a screen for selecting a symbol table to be replaced. A selected symbol table to be replaced, of course, may be displayed (an example of a symbol table to be replaced will be described later with reference to FIG. 5).

The specification of a sequence program (or sequence programs) and/or a subprogram (or subprograms) causes the automatic selection function to select all symbol tables belonging to the program (programs). As for registered contents of before-after replacement information of signal addresses, four pieces of replacement data are input. The first to third of the four pieces each indicate the correspondence between signal address before replacement and signal after replacement. That is, the first to third pieces indicate that replacement "R0.0→R1.0" is to be registered, that replacement "R1.0→Y4.2" is to be registered, and that replacement "R2.0→R0.0" is to be registered, respectively. The fourth piece indicates the correspondence between a signal address before replacement and signal address after replacement in the above-described format with a specifying of range.

More specifically, "R3 R5" in the field of before-replacement signal address means all signal addresses between R3 and R5. If there are signal addresses of, e.g., R3.1, R3.5, R4.1, and R4.7, the signal addresses between R3 and R5 include them in addition to R3 and R5. The character string "R5 R7" in the field of after-replacement signal address corresponding to "R3 R5" means that R3 (before-replacement address) corresponds to R5 (after-replacement address); R5 (before-replacement address), R7 (after-replacement address); R3.1 (before-replacement address), R5.1 (after-replacement address); R3.5 (before-replacement address), R5.5 (after-replacement address); R4.1 (before-replacement address), R6.1 (after-replacement address); and R4.7 (before-replacement address), R6.7 (after-replacement address).

In other words, the fourth input piece of data in the registration screen shown in FIG. 3, "R3 R5 R5 R7" indicates the details of registration, i.e., that an arbitrary before-replacement signal address of Rx ($3 \leqq x \leqq 5$) should be replaced with a after-replacement signal address of R(x+2).

When input on the screen as described above is completed, and an operator presses an "Execute" button on the screen, registration of before-after replacement information of signal address, selection of a sequence program (or sequence programs) and/or a subprogram (or subprograms) to be edited (each to be simply referred to as a "editing target sequence program" hereinafter), and selection of a symbol table (or symbol tables) to be replaced are completed. The details of registration and selection are stored in the RAM 13 (see FIG. 1).

Next, the case where a specific subprogram ("subprogram Sk") is specified as an object to be replaced, in stead of selecting "All Programs" as an object to be edited, is explained below. In this case, a subprogram Si (i=1, 2, . . . , k . . . , n) is composed of a sub-sequence program Qi and a symbol table Ti. Further, the symbol table Ti is composed of an "entire" global symbol Sg which can be referred to from each of the subprograms (S1 to Sn) and a local symbol Li proper to the specified subprogram Si.

In the state described above, if an operator presses an "Execution" button on the screen, the address of the sequence program Qk in the specified subprogram Sk is replaced, and further the addresses of the local symbol Lk and the global symbol Sg in the symbol table Tk are replaced.

Step S2: Sequence programs to be edited and symbol tables to be replaced, which were selected in step S1, are duplicated and temporarily stored in the RAM 13 (see FIG. 1). These duplicates are prepared to prevent an occurrence of situation where, when an instruction is given to, e.g., interrupt or cancel replacement processing after the start of replacement work, it becomes impossible to restore each of the programs and tables to its original state (see steps S9 and S10 to be described later).

Step S3: A search in the sequence programs to be edited selected in step S1 starts. The order (direction) of search is determined in advance in accordance with an appropriate rule such that the same position of each program is never searched again. There are known various rules for determining the search order (direction). For example, the search order may be determined in accordance with a rule using the alphabetical order, numerical order, or the like of the names of the registered sequence programs to be edited. If they have subprograms, the search order may be determined in accordance with a rule using the alphabetical order, numerical order, or the like of the file names of the subprograms. The search direction in each program may be the forward direction of the program statement.

A character string to be searched for in this step is one arbitrary signal address.

Step S4: If any signal address is found, the program proceeds to step S5. On the other hand, if no signal address is found, the program proceeds to step S8.

Step S5: It is checked whether the signal address found in step S3 is one of the before-replacement signal addresses which were registered in step S1. In this example, it is checked whether the signal address is one of R0.0, R1.0, R2.0, and an arbitrary signal address falling within the range of R3 to R5. If the signal address is one of them, the program proceeds to step S6; otherwise, to step S7.

Step S6: The replacement target signal address is replaced with a corresponding after-replacement signal address in accordance with the before-replacement signal address information and the after-replacement signal address information (the correspondence between the signal addresses to be replaced and the replacing ones, registered in step S1). The name of the program in which the replacement is performed and the location where the replacement is performed (the position in the program statement) are stored.

Step S7: It is determined whether there are anymore unsearched portions. If there is any unsearched portion, the program returns to step S3 to continue the search and repeat the processing to step S7. On the other hand, if the search is completed for all of the programs selected in step S1, the program proceeds to step S8.

Step S8: A search in the symbol tables to be replaced selected in step S1 starts. The order (direction) of search is determined in advance in accordance with an appropriate rule such that the same position of each symbol table is never searched again. A rule for determining the search order (direction) may be the same as that explained in step S3. For example, the search order may be determined in accordance with a rule using the alphabetical order, numerical order, or the like of the names of the registered symbol tables to be replaced. The search direction in each symbol table may be the forward direction.

A character string to be searched for in this step is one arbitrary signal address.

Step S9: If any signal address is found, the program proceeds to step S10. On the other hand, if no signal address is found, the program proceeds to step S13.

Step S10: It is checked whether the signal address found by the search in step S8 is one of the before-replacement signal addresses which were registered in step S1. In this example, it is checked whether the signal address is one of R0.0, R1.0, R2.0, and an arbitrary signal address falling within the range of R3 to R5. If the signal address is one of them, the program proceeds to step S11; otherwise, to step S12.

Step S11: The replacement target signal address is replaced with a corresponding after-replacement signal address in accordance with the before-after replacement information of signal addresses (in accordance with the information on the correspondence between signal address before replacement and signal address after replacement, which was registered in step S1). The name of the symbol table in which the replacement is performed and the location where the replacement is performed (the position in the symbol table) are stored.

Step S12: It is determined whether there are any more unsearched portions. If there is any unsearched portion, the program returns to step S8 to continue the search and repeat the processing to this step. If the search is completed for all of the symbol tables selected in step S, the program proceeds to step S13.

Step S13: Error checking is performed. The presence or absence of an error is determined in, e.g., the following manner:

(1) The sequence programs are checked if any replacement with addresses, output to which is inhibited, is performed. If such an replacement with addresses, output to which is inhibited, is performed, it is determined that an error has occurred. This aims at coping with a situation where although a certain address is set such that output to the address is inhibited for some reasons (e.g., the address is one used exclusively for another purpose), an operator disregards (forgets) it and sets the details of replacement.

Note that an addresses, output to which is inhibited, is generally set in advance in the nonvolatile memory 14.

(2) It is checked whether the one-to-one correspondence between addresses and symbols is maintained in the after-replacement symbol tables. If a plurality of different symbols correspond to a single address or a single symbol corresponds to a plurality of different addresses, it is determined that an error has occurred.

Step S14: If there is no error, the process ends. Note that the duplicate data made in step S2 may be erased. If there is any error, a cancel instruction (restore instruction) is issued from the processor 11 (see FIG. 1), and the replacement-related data obtained in the processing to step S12 are abandoned. The duplicate data made in step S2 are returned from the RAM 13 to the nonvolatile memory 14, and the sequence programs and symbol tables are restored to their original states, i.e., the states before the start of the batch replacement processing. An error message or the like (e.g., "Replacement Processing Canceled") is displayed on the display device 43, and the process ends.

Figure 4:
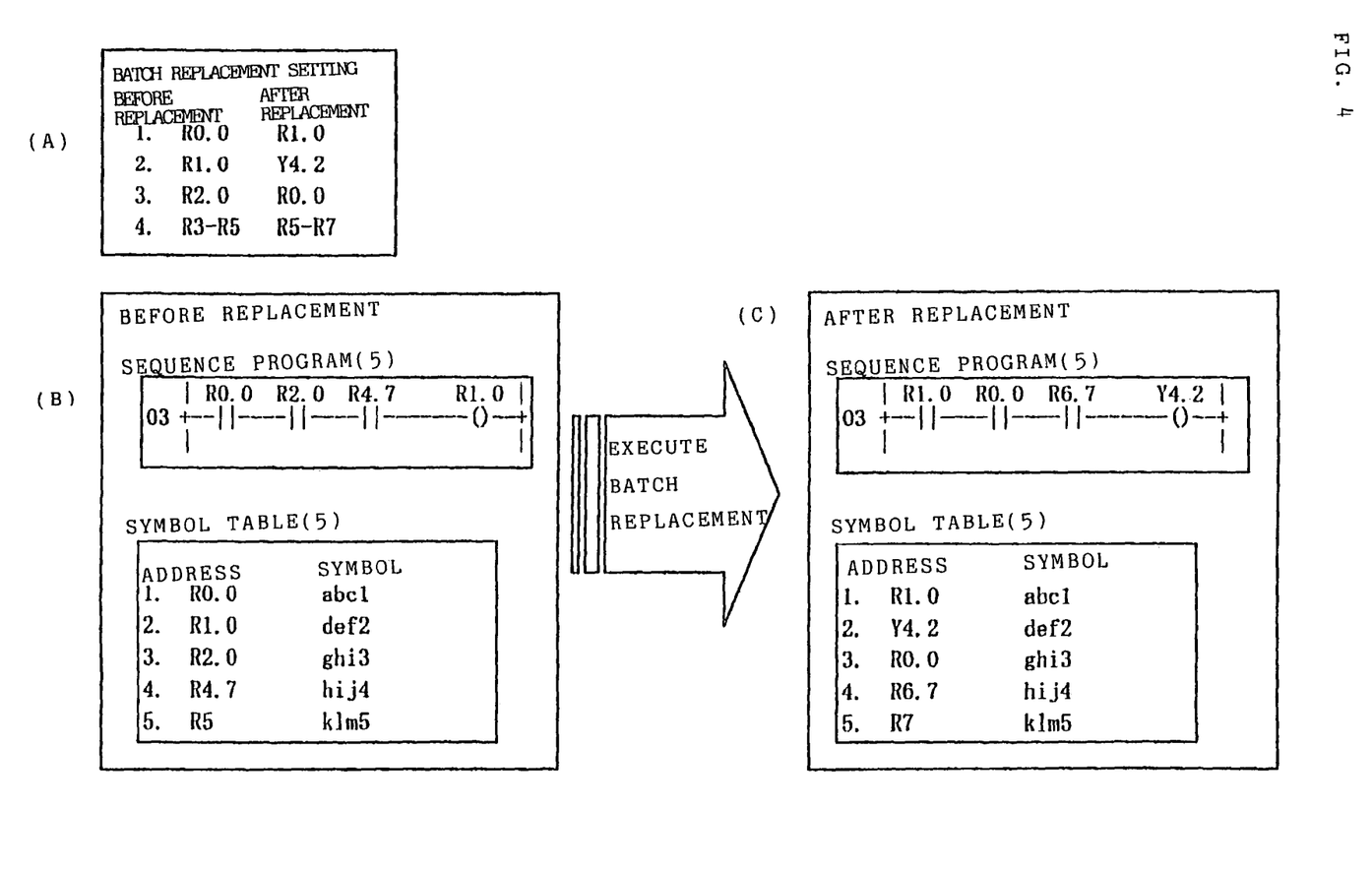
FIG. 4 is a chart for explaining a state before batch replacement processing and one after completion of batch replacement processing.

FIG. 4 is a chart for explaining a state before the above-described batch replacement processing and a state after completion of the batch replacement processing (without any error). A portion denoted by (A) in FIG. 4 indicates the correspondence between signal addresses before replacement and signal addresses after replacement. The portion corresponds to the details of registration shown in FIG. 3, which have been described above. A portion denoted by (B) in FIG. 4 indicates the states of a sequence program before replacement and a symbol table belonging to the sequence program. A portion denoted by (C) in FIG. 4 indicates the states of the sequence program after replacement and the symbol table belonging to the sequence program. The example of FIG. 4 shows the states of before and after replacement information of a set of editing target sequence program and symbol table to be replaced in contrast with each other. The names of the illustrated program and table are "SEQUENCE PROGRAM (5)," and "SYMBOL TABLE (5)," respectively.

As will be understood from this contrastive display, the signal address of R0.0 in the sequence program (5) and symbol table (5) before replacement is replaced with R1.0; the signal address of R1.0, Y4.2; the signal address of R2.0, R0.0; and the signal address of R4.7, R6.7. The signal address of R5 in the symbol table (5) before replacement is replaced with R7.

This replacement cannot be implemented by a conventional method of repeating an individual replacement operation. More specifically, in a conventional method, R0.0 is first replaced with R1.0, R1.0 is replaced with Y4.2, and R2.0 is replaced with R0.0. That is, search and replacement are performed three times for each of the sequence program and symbol table, and an unintentional replacement result is obtained. By the conventional method, R0.0 to be replaced ends up in Y4.2, which is an obviously unintentional result. In contrast with this, batch replacement replaces addresses in the sequence program and symbol table at a time, thus obtaining an intended replacement result.

Figure 5:
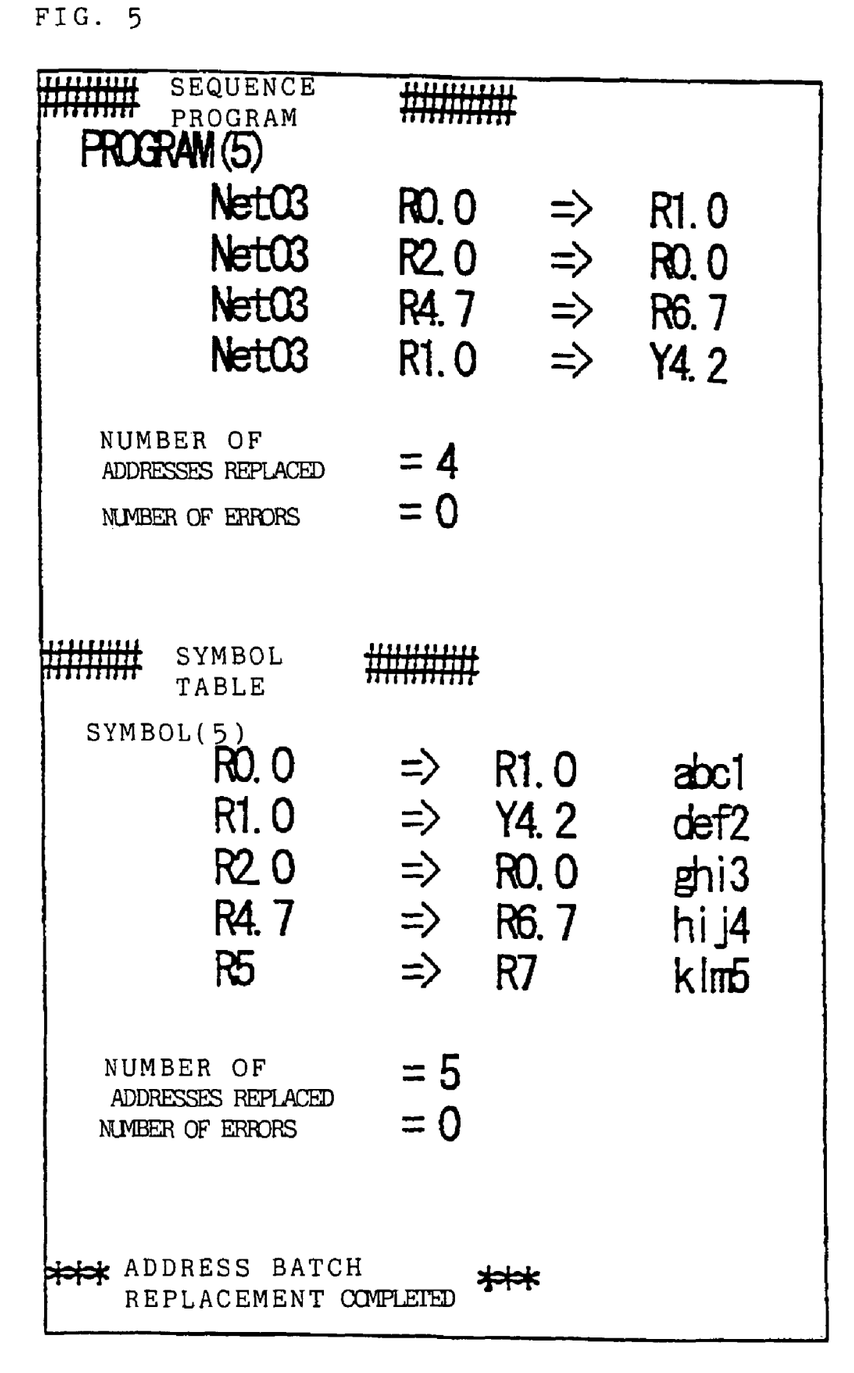
FIG. 5 is a view showing a display example of the details of replacement stored during batch replacement processing.

FIG. 5 is a display example of the details of replacement stored in steps S6 and S11 of the batch replacement processing. After replacement processing, an operator becomes able to display these contents on the display device 43 by pressing a "View Log" button with operation of the keyboard 44 or the like.

FIG. 5 illustrates the data about the sequence program (5) and that about the symbol table (5) belonging to the program, corresponding to FIG. 4. FIG. 4 indicates that each of replacement "R0.0→R1.0," replacement "R1.0→Y4.2," replacement "R2.0→0 R0.0," and replacement of "R4.7→R6.7" has been performed for three occurrences (Net03). FIG. 4 also indicates that the number of replaced addresses in the sequence program (5) is four and that no error has occurred.

The correspondence between addresses to be replaced and replacing ones in the symbol table (5) is also displayed. FIG. 4 further indicates that the number of replaced addresses in the symbol table (5) is five and that no error has occurred. It goes without saying that if there are other sequence programs or symbol tables with replaced portions, the data about them can be displayed in the same manner as described above.

The invention claimed is:

1. A sequence program editing apparatus to edit a sequence program used to control an automatic machine, comprising:

program storage means for storing a replacement target sequence program having signal addresses;

registration and storage means for registering and storing before-after replacement information which specifies a plurality of before-replacement signal addresses to be replaced and specifies after-replacement signal addresses respectively corresponding to the specified plurality of before-replacement signal addresses;

address search means for searching the replacement target sequence program having signal addresses, for a signal address;

checking means for checking whether the signal address searched for by the address search means is any one of the before-replacement signal addresses in the before-after replacement information which has been stored and registered in the registration and storage means; and signal address replacement means for executing replacement of each of the before-replacement signal addresses checked for by the checking means with a corresponding after-replacement signal address, in accordance with the before-after replacement information;

wherein the sequence program editing apparatus performs a processing series in which the address search means searches signal addresses, the checking means checks, and the signal address replacement means repeatedly executes replacement of signal addresses in order from the start of the sequence program to the end of the sequence program to replace addresses, thereby avoiding replacing the same position of the sequence program again.

2. A sequence program editing apparatus to edit a sequence program used to control an automatic machine, comprising:

replacement target symbol storage means for storing symbol information assigned to a signal address used in a replacement target sequence program having signal addresses;

registration and storage means for registering and storing before-after replacement information which specifies a plurality of before-replacement signal addresses to be replaced and specifies after-replacement signal addresses respectively corresponding to the specified plurality of before-replacement signal addresses;

address search means for searching the symbol information stored in the replacement target symbol storage means for a signal address;

checking means for checking whether the signal address searched for by the address search means is any one of the before-replacement signal addresses in the before-after replacement information which has been stored and registered in the registration and storage means; and signal address replacement means for executing replacement of each of the before-replacement signal addresses checked for by the checking means with a corresponding after-replacement signal address, in accordance with the before-after replacement information;

wherein the sequence program editing apparatus performs a processing series in which the address search means searches signal addresses, the checking means checks, and the signal address replacement means repeatedly executes replacement of signal addresses in order from the start of the symbol information to the end of the symbol information to replace addresses, thereby avoiding replacing the same position of the symbol information again.

3. A sequence program editing apparatus to edit a sequence program used to control an automatic machine, comprising:

program storage means for storing a replacement target sequence program having signal addresses;

registration and storage means for registering and storing before-after replacement information which specifies a plurality of before-replacement signal addresses to be replaced and specifies after-replacement signal addresses respectively corresponding to the specified plurality of before-replacement signal addresses;

first address search means for searching the replacement target sequence program having signal addresses, for a signal address;

first checking means for checking whether the signal address searched for by the first address search means is any one of the before-replacement signal addresses in the before-after replacement information which has been stored and registered in the registration and storage means; and first signal address replacement means for executing replacement of each of the before-replacement signal addresses checked for by the first checking means with a corresponding after-replacement signal address, in accordance with the before-after replacement information;

wherein the sequence program editing apparatus performs a processing series in which the first address search means searches signal addresses, the first checking means checks, and the first signal address replacement means repeatedly executes replacement of signal addresses in order from the start of the sequence program to the end of the sequence program to replace addresses, thereby avoiding replacing the same position of the sequence program again; and the sequence program editing apparatus further comprising:

replacement target symbol storage means for storing symbol information assigned to a signal address used in the replacement target sequence program having signal addresses;

second address search means for searching the symbol information stored in the replacement target symbol storage means for a signal address;

second checking means for checking whether the signal address searched for by the second address search means is any one of the before-replacement signal addresses in the before-after replacement information which has been stored and registered in the registration and storage means; and second signal address replacement means for executing replacement of each of the before-replacement signal addresses checked for by the second checking means with a corresponding after-replacement signal address, in accordance with the before-after replacement information;

wherein the sequence program editing apparatus performs a processing series in which the second address search means searches signal addresses, the second checking means checks, and the second signal address replacement means repeatedly executes replacement of signal addresses in order from the start of the symbol information to the end of the symbol information to replace addresses, thereby avoiding replacing the same position of the symbol information again.

* * * * *

UNITED STATES PATENT AND TRADEMARK OFFICE
CERTIFICATE OF CORRECTION

| | | |
|---|---|---|
| PATENT NO. | : 7,877,728 B2 | Page 1 of 1 |
| APPLICATION NO. | : 11/416138 | |
| DATED | : January 25, 2011 | |
| INVENTOR(S) | : Yasushi Onishi et al. | |

It is certified that error appears in the above-identified patent and that said Letters Patent is hereby corrected as shown below:

Title Page Item (75) (Inventors), delete "Fujiyoshida" and insert -- Yamanashi --, therefor.

Title Page 2 Item (56) (Other Publications), delete "authorI kkai," and insert -- author: Ikkai, --, therefor.

Column 2, Line 20 delete ""A1→A10" and insert -- "A1-A10 --, therefor.

Column 6, Line 24, delete "device43" and insert -- device 43 --, therefor.

Column 6, Line 28 after "replacement)" insert -- . --.

Column 7, Line 38 delete "k..., n)" and insert -- k,..., n) --, therefor.

Column 9, Line 2 delete "S," and insert -- S1, --, therefor.

Column 10, Line 17 delete ""R2.0→0 R0.0,"" and insert -- "R2.0→R0.0," --, therefor.

Signed and Sealed this
Twenty-sixth Day of April, 2011

David J. Kappos
*Director of the United States Patent and Trademark Office*